July 5, 1932.  W. J. CROWELL, JR  1,865,507
METHOD AND APPARATUS FOR EFFECTING AUTOMATIC ADJUSTMENTS
OF THERMOSTATICALLY CONTROLLED HEATERS
Filed May 31, 1930   8 Sheets-Sheet 1
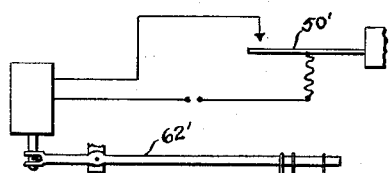
Fig. 2
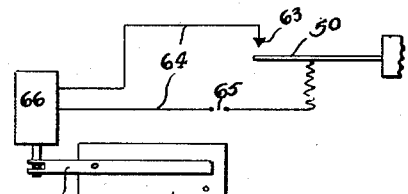
Fig. 1
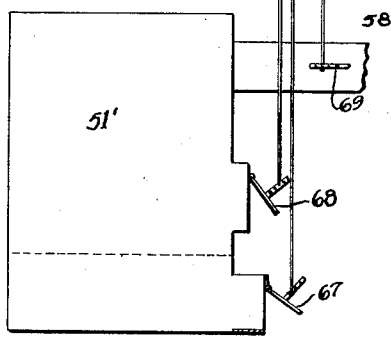
Fig. 3
Fig. 4
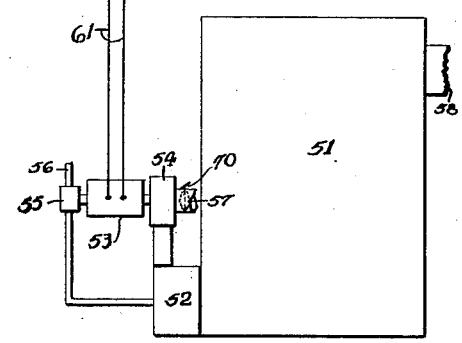
Fig. 7
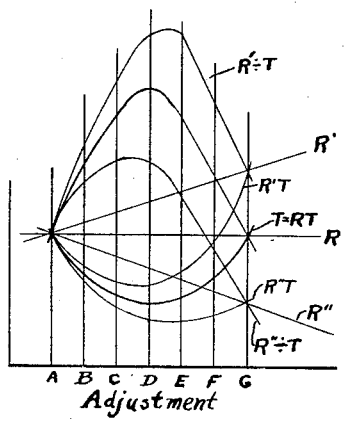
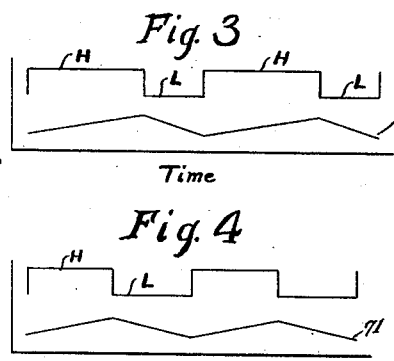
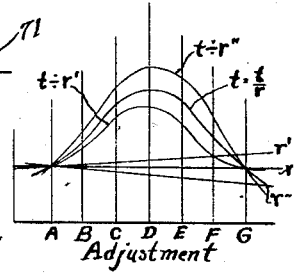
Fig. 8
Fig. 5
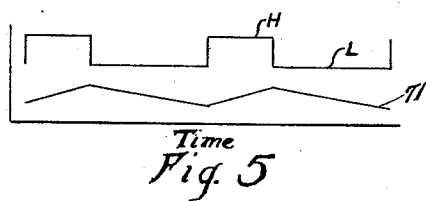
Fig. 6
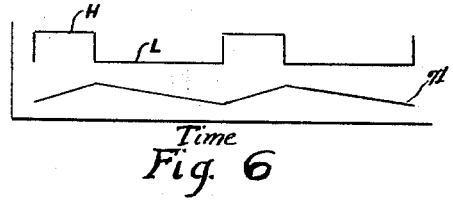
Witness:
Wm. J. Crowell 3rd
Inventor:
Wm. J. Crowell Jr.

July 5, 1932. W. J. CROWELL, JR 1,865,507
METHOD AND APPARATUS FOR EFFECTING AUTOMATIC ADJUSTMENTS
OF THERMOSTATICALLY CONTROLLED HEATERS
Filed May 31, 1930  8 Sheets-Sheet 2

A

D

Witness:
Wm J. Crowell 3rd

Inventor:
Wm J. Crowell Jr

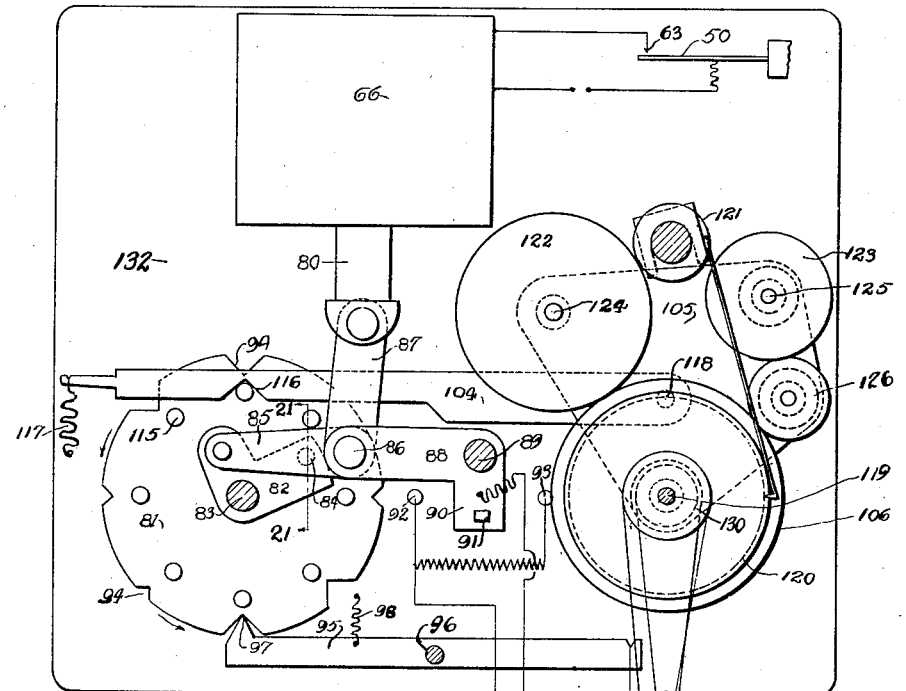

July 5, 1932. W. J. CROWELL, JR 1,865,507
METHOD AND APPARATUS FOR EFFECTING AUTOMATIC ADJUSTMENTS
OF THERMOSTATICALLY CONTROLLED HEATERS
Filed May 31, 1930 8 Sheets-Sheet 4
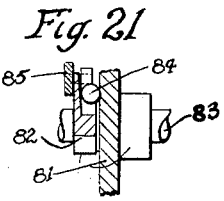
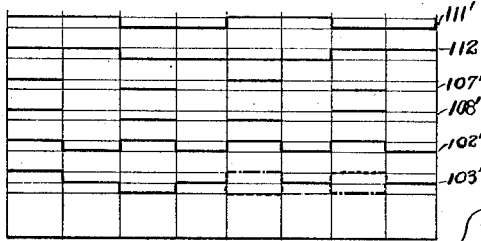
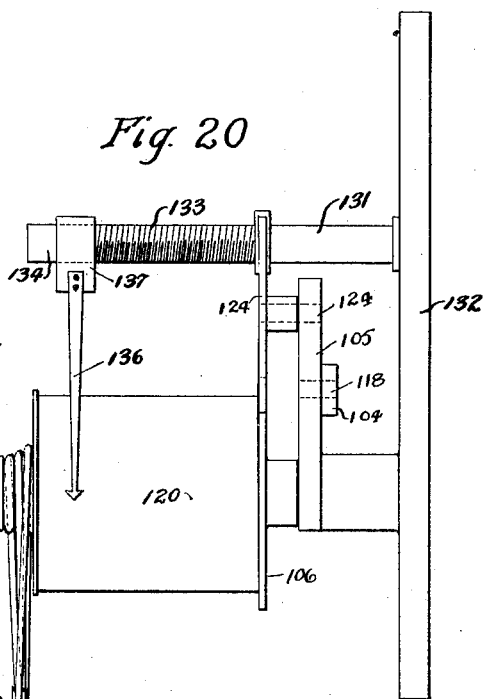
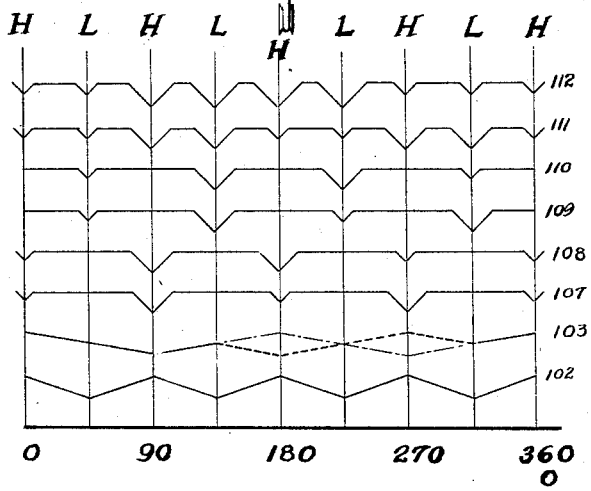

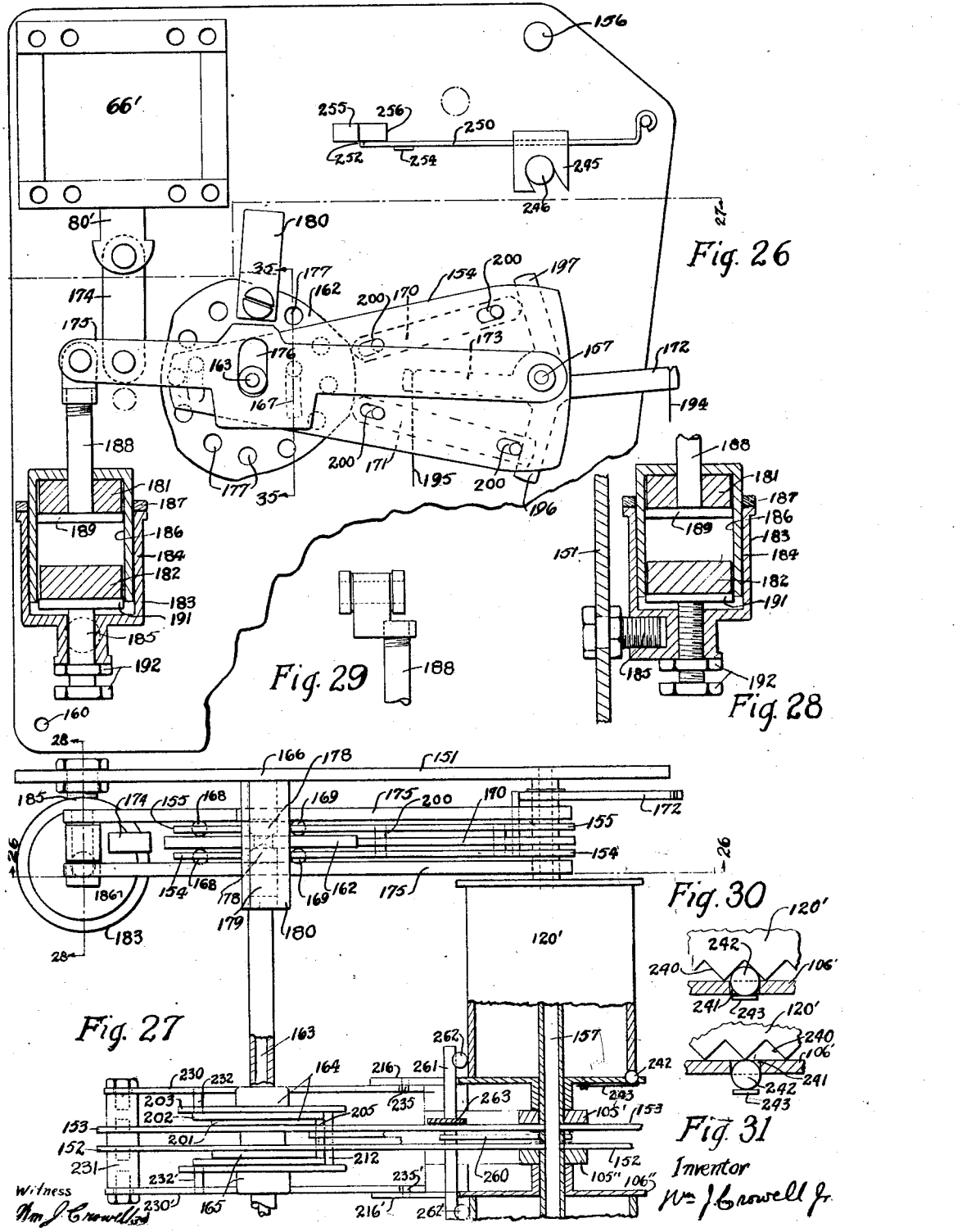

July 5, 1932.  W. J. CROWELL, JR  1,865,507
METHOD AND APPARATUS FOR EFFECTING AUTOMATIC ADJUSTMENTS
OF THERMOSTATICALLY CONTROLLED HEATERS
Filed May 31, 1930  8 Sheets-Sheet 8

Witness
Wm. J. Crowell 3rd

Inventor
Wm. J. Crowell Jr.

Patented July 5, 1932

1,865,507

UNITED STATES PATENT OFFICE

WILLIAM J. CROWELL, JR., OF WYNCOTE, PENNSYLVANIA

METHOD AND APPARATUS FOR EFFECTING AUTOMATIC ADJUSTMENTS OF THERMOSTATICALLY CONTROLLED HEATERS

Application filed May 31, 1930. Serial No. 458,208.

My invention relates to a method and apparatus for operating a thermostatically controlled heater, and is believed to have perhaps its widest application with thermostatically controlled domestic heaters, firing gas, oil, or coal.

A purpose of my invention is to operate a furnace of the kind indicated in a way to give a record indication of the need or lack of need of air adjustment or to automatically effect any needed air adjustment, either or both, the air adjustment being such as to secure better fuel economy.

The thermostatic control to which my invention is thought to have its best application involves operating a furnace at alternately high and low rates of heating.

The controlling temperature normally slowly rises during the periods of high heating and slowly falls during the periods of low heating, the thermostat effecting a shift from a high heating setting to a low heating setting, when the temperature rises to a predetermined upper limit for example to 70 degrees F. and shifting back to the high setting when the temperature falls to a predetermined low limit, for example 69 degrees F., the process repeating over and over to maintain the controlling temperature between the selected upper and lower limits, as between 70 and 69 degrees F.

In this type of thermostatic control there are thus normally used but the two settings, a setting for high heating and a setting for low heating, the rate of heating with the high setting being more than enough to maintain room temperature, the high and low settings alternating over and over.

A further purpose of my invention is to use differences of duration of two high combustion periods or of two low combustion periods incident to a swing of adjustment to which combustion efficiency is responsive to indicate the need or lack of need for a change of adjustment.

A further purpose is to arrange periods of the same settings, particularly the periods of the high settings in couples providing a difference between the air adjustments of the furnace during the periods of each couple and to use a resulting difference in the duration of the periods to indicate or effect, either or both, a permanent adjustment to secure better fuel economy.

A further purpose is to make a record of the durations of the high heating periods arranged in couples, each couple comprising two periods of high setting separated by a period of low setting, and with an adjustment during one period of the couple different from that during the other period of the couple, the adjustment being one to which efficiency of combustion is responsive, usually an adjustment in the secondary air to a coal furnace or with an oil or gas furnace in the total air accompanying a set flow of fuel, the recording pen traveling continuously but slowly in one direction across the chart, and the chart moving from right to left transversely to the movement of the pen throughout one period and from left to right throughout the other period, the differences of the lengths in the records of durations incident to the differences of the adjustment giving a visual indication of the need for permanent adjustment.

A further purpose is to make adjustment of a valve to which the combustion efficiency of a furnace of the character indicated is responsive until the durations of the heating periods of corresponding heating settings are unaffected by small adjustments in either direction.

A further purpose is to effect an automatic progression in the draft adjustment of a furnace of the character indicated to that for best furnace efficiency and thereafter to effect such automatic maintenance or shifting of the adjustment as may be needed to secure best furnace efficiency.

A further purpose is to avoid making any permanent adjustments for differences of duration of heating periods that have differed with respect to an air adjustment to which duration of the period should be responsive when such differences of duration are abnormally high as too great to be due to the difference in the air adjustment.

A further purpose is to progress an adjustment member in one direction throughout a heating period having one adjustment setting and to progress it in reverse direction throughout a later period of corresponding heating setting but having a different air adjustment and to use the net progress of the member to effect a permanent air adjustment.

A further purpose is to operate a furnace thermostatically alternately on two heating settings, a high heating setting during which the rate of heating is greater than needed to maintain a desired temperature and a low heating setting during which the rate of heating is less than needed to maintain the said temperature, the high heating setting alternating with the low heating setting, to divide the periods of high heating settings into adjustment couples and the periods of low heating into adjustment couples giving the furnace a different adjustment with respect to furnace efficiency throughout one period of each couple from that throughout the other period of the couple, and to use the difference in duration of the said coupled periods to indicate or effect, either or both, any needed permanent adjustment for the furnace when operating on the high heating settings and for the furnace when operating on the low heating settings, either or both.

Further purposes will appear in the specification and in the claims.

I have elected to illustrate, partially diagrammatically. one main form only of my invention, showing however detail modifications, for application of the invention to the same or to different types of furnace and have selected a form that is practical and efficient in operation and which well illustrates the principles involved.

Figures 1 and 2 are diagrammatical elevation views indicating typical thermostatically controlled furnaces of the prior art, the views being intended for conventional illustrations of any thermostatically controlled heaters to which my invention is adapted to be applied.

Figure 1 is intended to indicate a thermostatically controlled furnace using a fluid fuel,—gas or oil, and Figure 2 is intended to indicate a coal furnace, the coal feed not being shown.

Figure 3 illustrates typical plots against time of the furnace setting and of the room temperature used to thermostatically control the setting.

Figures 4 and 5 and 6 are views corresponding to Figure 3 but illustating conditions with respect to the durations of high and low furnace settings and with respect to temperature with progressively different and better adjustment of combustion conditions, the furnace setting and the rates of fuel consumption during these settings and the outside temperature conditions being assumed the same in all of the curves of Figures 3 to 6.

Figure 7 gives hypothetical graphs of furnace characteristics against a furnace adjustment controlling fuel economy, with the furnace operating on a high heating setting, the graphs indirectly illustrating the possible improvement with respect to fuel economy incident to a better adjustment of the air at the given setting of the furnace both when the rate of fuel consumption at any setting is independent of change in the adjustment, as is usually the case with thermostatically controlled oil or gas furnaces and when the rate of fuel consumption is more or less variant if the air adjustment is varied, which is usually to some extent true with thermostatically controlled coal furnaces.

Figure 8 gives hypothetical graphs corresponding generally to those of Figure 7 except that the graphs of Figure 8 represent conditions during the periods of low heating, and the graphs of Figure 7 represent conditions during periods of high heating, the low and high heating periods alternating.

Figure 9:
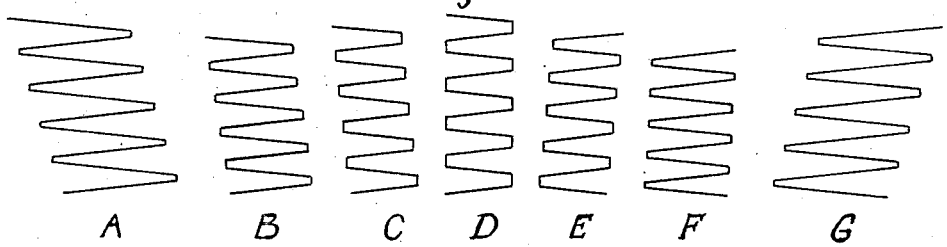

Figure 9 shows a number of hypothetical records embodying one feature of my invention and being adapted to indicate the need or lack of need of a change in the air adjustment, the records being representative of combustion conditions during high heat settings, the vertical ordinants on these hypothetical records representing a continuous vertical travel of a recording pen are considerably exaggerated as compared to usual records. The lengths of the sloping line records give the durations of the high heating periods, arranged in adjustment couples, there being a difference of air adjustment during one heating period of each couple as compared to that during the other period thereof. The short vertical lines between the oppositely sloping long lines represents the travel of the recording pen during the low heating period intermediate two high heating periods.

Figure 10:
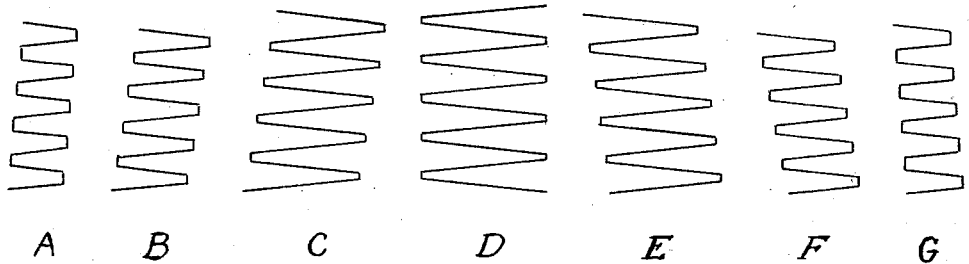

Figure 10 gives hypothetical records corresponding generally to those of Figure 9 except that they are taken for the low heating periods.

Figure 11:
Figure 12:
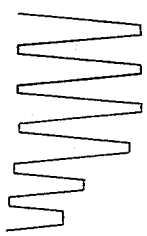

Figures 11 and 12 illustrate hypothetical records respectively for the high and low heating settings when using my automatic progressive adjustments to effect most efficient combustion and therefore lowest fuel consumption.

Figure 13:
Figure 14:

Figures 13 and 14 are hypothetical records corresponding respectively to the first and fourth records of Figure 9 but with the vertical ordinants more nearly in accord with what should be actual practice, giving a slope far more apparent than is the case with the curves illustrated in Figures 7 to 12.

Figure 15:
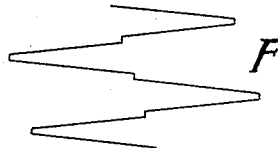

Figure 15 is a hypothetical record corresponding to the first record of Figure 9 but with a different method of pairing or coupling the high heating periods to secure a better elimination of the influences of any progressively changing heat requirements upon the indications of the record.

Figure 16 is a side elevation, partly diagrammatical, of structure embodying one form of a portion of my invention.

Figures 17, 18 and 19 are diagrammatical views illustrating different ways of making air adjustment connections to a heater.

Figure 20 is an end view of part of the structure shown in Figure 16 to illustrate recording mechanism not shown on Figure 16.

Figure 21 is a fragmentary section taken upon the line 21—21 of Figure 16.

Figure 22 is a diagrammatical plot illustrating different relations with respect to the angular position of a cam wheel shown in Figure 16.

Figure 23 is a diagrammatical plot illustrating different relations with respect to time of a period corresponding to one revolution of the said cam wheel.

Figure 24:
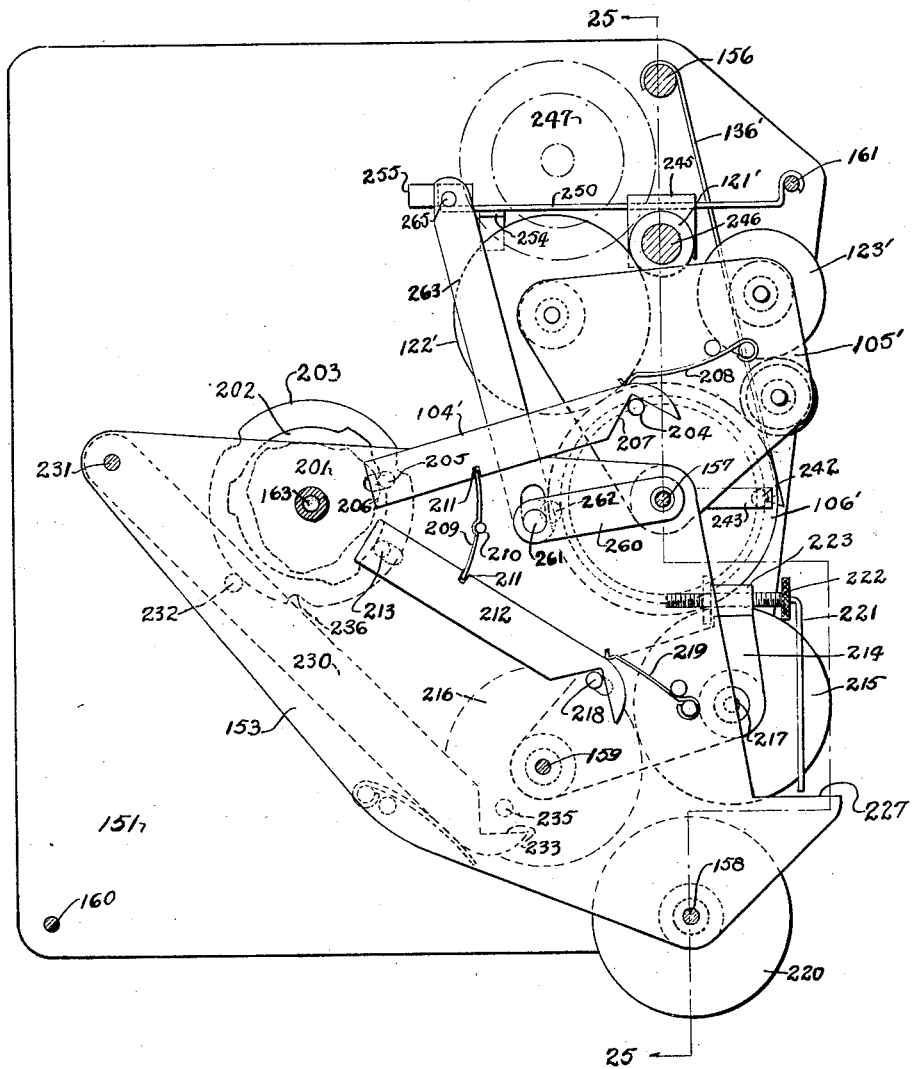
Figure 25:
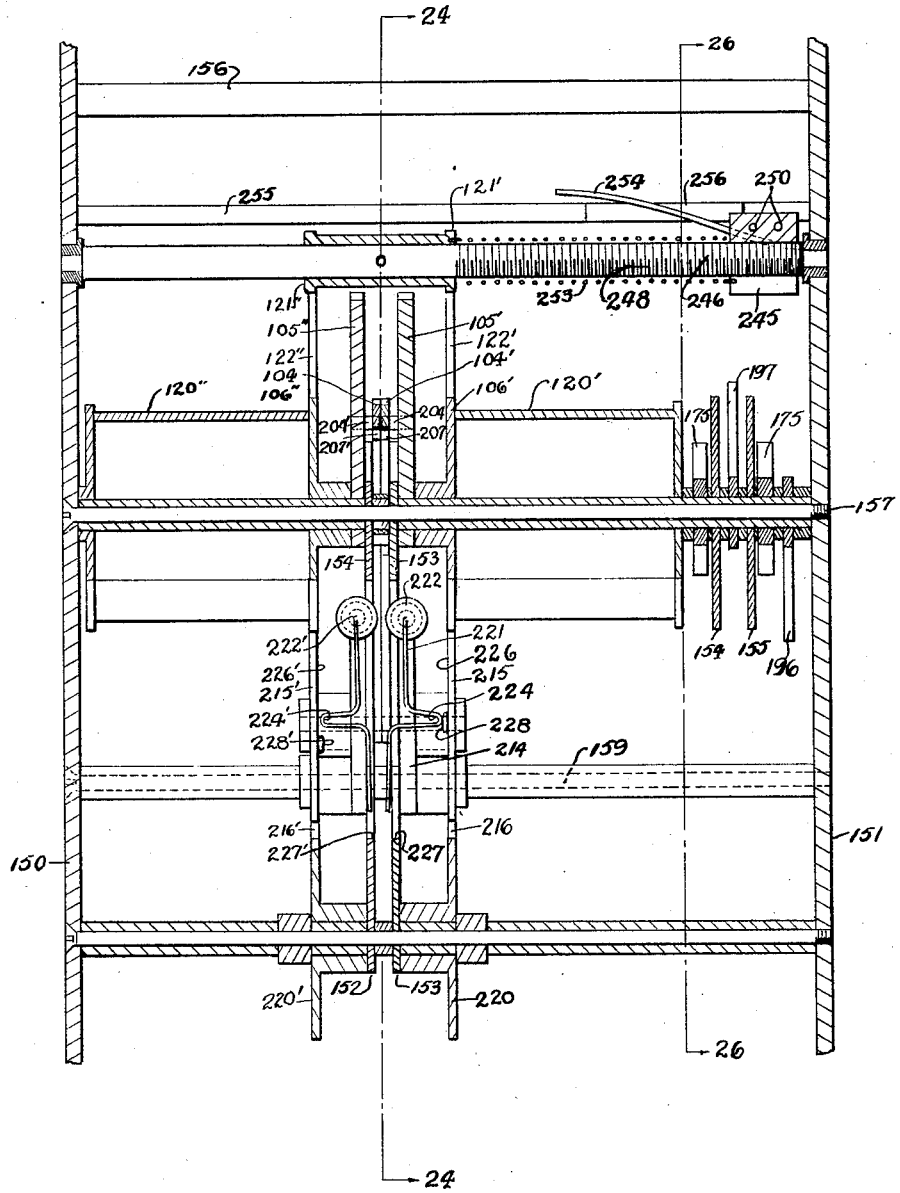

Figure 24 is a sectional side elevation of structure embodying a desirable feature of my invention, the view being taken upon the line 24—24 of Figure 25.

Figure 25 is a vertical section taken upon the line 25—25 of Figure 24.

Figure 26 is a vertical section taken upon the line 26—26 of Figure 25.

Figure 27 is a horizontal section taken on the line 27—27 of Figure 26.

Figure 28 is a vertical section taken upon the line 28—28 of Figure 27.

Figure 29 is a fragmentary extension of Figure 28.

Figure 30 is an enlarged scale detail in part section.

Figure 31 is a view corresponding to Figure 30, but showing the parts in different position, the two views Figures 30 and 31 illustrating mechanism shown in Figure 27 for automatically advancing the chart at the end of each day.

Figure 32:
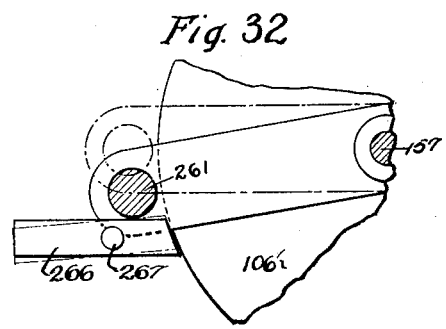

Figure 32 is a fragmentary view corresponding to Figure 24 to enlarged scale and showing parts not shown in Figure 24 and used when automatically advancing the chart for another day.

Figure 33:
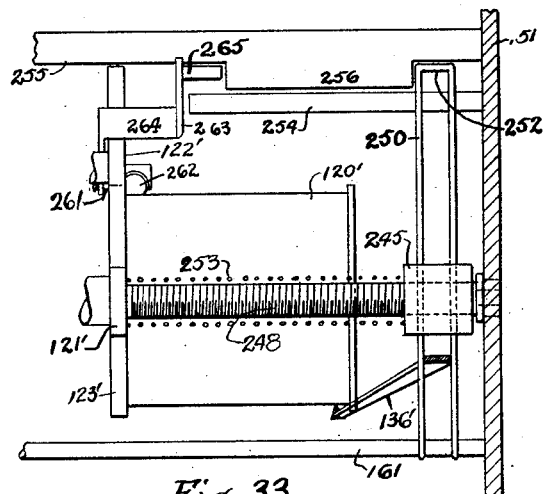

Figure 33 is a fragmentary top plan view illustrating the recording mechanism.

Figure 34:
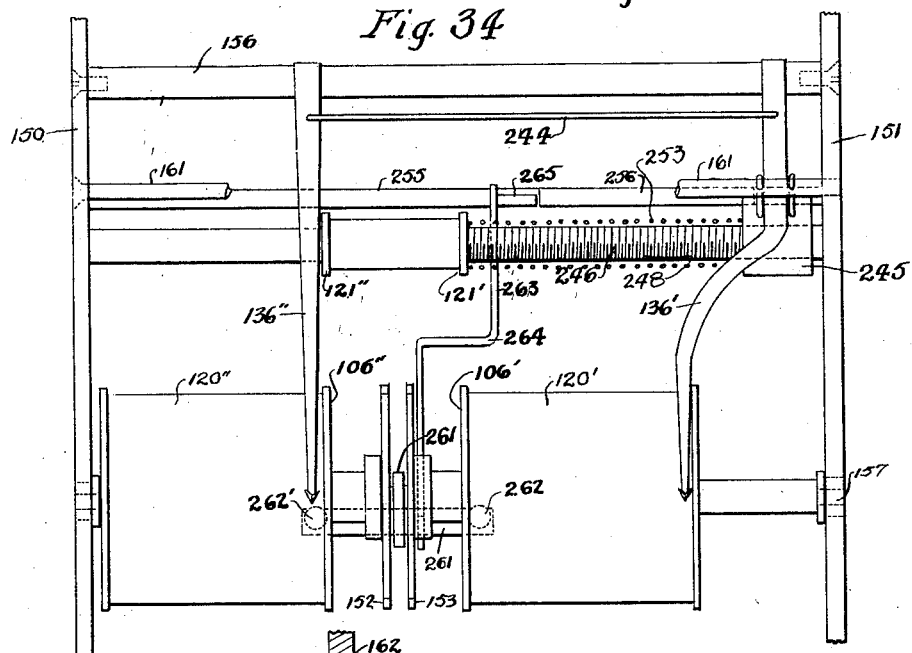

Figure 34 is a front elevation of Figure 24.

Figure 35:
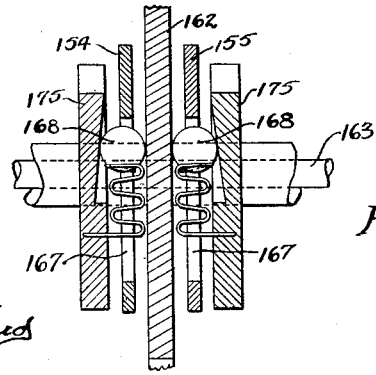

Figure 35 is a detail section on the line 35—35 of Figure 26.

I illustrate in Figures 1 and 2 typical thermostatically controlled heaters of the prior art.

In Figure 1 a thermostat 50 is shown controlling the heating setting of a furnace 51 supplied with a fluid fuel, e. g. oil, at a burner 52. A motor 53 is shown direct connected to a fan 54 and to an oil supply pump 55, the fan and pump being fastened to the shaft of the motor, thus delivering air and oil to the burner at rates determined by the speed of the motor and that is changed proportionately when the motor speed is changed.

Oil and air inlets to the pump and fan are indicated at 56 and 57 respectively. The waste products of combustion leave the furnace by a flue 58.

The motor circuit includes a source of current 59, a speed controller 60, and suitable wiring 61, the control arm 62 of the speed controller being positioned alternately at high and low speeds by the thermostat 50, as by means of an electric circuit including the thermostat, a contact 63, wiring 64, a source of energy 65 and a solenoid 66, the solenoid being operatively connected to the controller arm 62.

The thermostat is located at any suitable place at which it is desired to maintain a substantially uniform temperature by controlling the operation of the furnace.

When the temperature rises at the thermostat to say seventy degrees the thermostat makes or breaks the solenoid circuit at the contact 63 to shift the arm of the motor speed controller to its low speed position, the reverse operation taking place when the temperature at the thermostat falls to the predetermined low limit of say sixty-nine degrees.

In Figure 2 the heater 51 supplied with coal in any suitable way not shown, has draft doors 67 and 68 into the furnace respectively below the grate and into the space above the fuel bed, the waste products of combustion leaving the furnace at the pipe 58. A thermostat 50' shifts the position of a rocker 62' as in Figure 1.

The position of this rocker determines the heating setting of the furnace, the rocker being suitably connected to a damper 69 in the flue 58, to the door 68 and optionally also to the door 67.

The layouts of Figures 1 and 2 are illustrative of different types of thermostatically controlled heater furnaces but are alike in so far that in both lay-outs the furnaces operate alternately on high and low settings, with a thermostatic shift from high setting to low setting when the temperature rises to the predetermined high temperature, e. g. to seventy degrees, and with a thermostatic shift back from low setting to high setting when the temperature falls to the predetermined low temperature, e. g. to sixty-nine degrees.

During the high setting the furnace is generating heat at a rate sufficient to make the room temperature rise, even during cold weather, and during the low setting it generates heat at a rate insufficient to keep the room temperature from slowly falling but at least adequate to hold the fire.

In normal practice it has hitherto rarely happened that the fuel-to-air ratio at a furnace of this type has been that for greatest fuel economy, and this has been all the more true because the temperature control at the thermostat is almost equally effective with low fuel economy as with high fuel economy,—with poor combustion as with perfect combustion.

As a result there has been in the past too little attention to the securing of best efficiency of combustion in furnaces of this type, with in fact almost no way in which an average person can determine how to set his air supply for a fuel economy reasonably near the economy that could be obtained with proper air adjustment.

My invention aims to correct this by providing a record adapted to show at a glance whether the air adjustment is or is not that for best fuel economy, and further to provide an automatic progression of the air adjustment to that for best fuel economy, with an automatic changing of the adjustment thereafter when changing furnace conditions make it desirable.

In a furnace using fluid fuel such as is intended to be indicated in Figure 1, the rate of fuel feed as determined by the speed of the motor 53 alternates between two values, high and low rates of feed that are determined by the high and low speeds of the motor and is fairly constant during either rate of heating.

The high rate of fuel feed has thus substantially the same value throughout all the periods of high heating irrespective of any adjustment of the air-to-fuel ratio, effected for example by valve adjustment in the air supply line. Also the low rate fuel feed has substantially one value during the periods of furnace operation on the low setting.

In a coal furnace with the coal charged into the furnace at perhaps indefinite intervals the fuel consumptions during the high and low settings is somewhat indeterminate, somewhat variant according to variant grate conditions and also somewhat variant with change in the admission of secondary air.

I find nevertheless that my method and apparatus is adapted to effective operation on most coal furnaces of the type of Figure 2 as well as on gas and oil furnaces of the type of Figure 1, even where an adjustment of secondary air at 68, Figure 2, affects the rate of combustion as well as the effectiveness of combustion.

In the furnace of Figure 1 the effectiveness of combustion is responsive to the adjustment of an air inlet valve 70, such adjustment being without effect upon the rate of fuel consumption which is determined by the speed of the pump 55 and therefore by the speed of the motor 53.

In the furnace of Figure 2 the fuel consumption is determined chiefly by the position of the valves 67 and 69, of which 67 may optionally be left permanently open and 69 adjustably closed to determine the high and low furnace setting.

The member 68 controls the admission of secondary air and thereby the effectiveness of combustion and has only a very minor effect upon the rate of combustion unless as is frequently done it is opened enough to serve as a check upon the furnace draft.

When used merely to admit secondary air to secure more effective combustion and not as a check draft its opening should ordinarily be too small as compared to the opening past the valve 69 to have much effect on the furnace draft.

Adjustment of the relatively small opening at 58' will adjust the effectiveness of combustion and at the same time have an indeterminate effect upon the rate of combustion,—an increase in the opening at 58' for example operating to increase the rate of fuel consumption by the admission of more air over the fuel and to decrease the rate of combustion by somewhat reducing the draft, the net result being probably small and indeterminate.

Figures 3 to 6 are hypothetical plots representing conditions at thermostatically controlled furnaces of the type illustrated in Figures 1 and 2, showing the alternating periods H and L of high heat and low heat settings and the alternating periods of rising and falling temperature 71, plotted against time.

The corresponding curves of the different figures are alike except for differences due to differences of air adjustment, a hypothetical average adjustment for the plots of Figure 3 having been progressively improved to a best adjustment for the plots of Figure 6.

It will be seen that this progressively better air adjustment results in a progressive shortening of the durations of the high settings H and a progressive lengthening of the durations of the low settings L and a resultant material saving of fuel consumption in that the proportion of time during which there is high fuel consumption has been greatly reduced.

Figure 7 applies to conditions when the furnace is at its high setting H and shows hypothetical plots against the position of an adjustment member to which combustion effectiveness is responsive, as against variant positions of the valve 70 of Figure 1 or against variant positions of the valve 68 of Figure 2.

With the conditions of Figure 1 the rate of fuel feed into the furnace is the rate of fuel consumption and is independent of the air adjustment, being therefore represented on Figure 7 by a horizontal line R. The line T represents the time duration of the high setting periods for different positions of the air adjustment member.

The plot T/R on Figure 7 is derived from the plots R and T, the value R/T being a figure of merit with respect to combustion efficiency.

It will be seen that as the air adjustment shifts to the right from a point A, which may be an average adjustment for a furnace operated in accord with the prior art, the duration T of the high setting and the effectiveness of combustion R/T respectively decrease and increase and then increase and decrease until at a point G they are again at the same value as at A, and that the highest value for combustion effectiveness corresponds to the lowest value for T.

Broadly my invention contemplates making progressive adjustments until the durations T of the high setting periods are of minimum value, in that the fuel economy, as determined for example by a plot of R/T is maximum when T is minimum.

In the foregoing R, the rate of fuel consumption during the high settings H has been assumed independent of the position of the adjustment member which is usually strictly true with furnaces of the type of Figure 1 and frequently nearly true with coal furnaces of the type of Figure 2.

If the rate of fuel consumption were to increase as the adjustment progresses to the right in accord with the line R' which assumes a fifty per cent increase in shifting from the adjustment A to the adjustment G, then R'/T can be taken to represent the effectiveness of combustion and the peak of the line R'/T representative of the greatest fuel economy is given by an adjustment only slightly away from the adjustment D that gives minimum T.

Again if the rate of fuel consumption were to decrease in accord with the line R'' which assumes fifty per cent decrease in shifting the adjustment from A to G, then the line R''/T representing effectiveness of combustion will have its peak shifted somewhat in the other direction, to the left of D.

It will be seen from inspection of these curves that even were there such an extreme variation of R as that represented by the lines R' and R'' a setting of the air adjustment at D, the position for minimum T, will give a fuel economy close to the best economy, indicating that the much smaller actual variations of R incident to proper changes of an air adjustment 68 of a coal furnace should not material shift the position for best fuel economy away from the position for a minimum T.

The lines RT, R'T and R''T give total fuel consumption for single periods of high setting H for rates of fuel consumption R, R' and R'' respectively.

Figure 8 applies to conditions when the furnace is operating on its low setting L, showing plots against the position of a valve member to which combustion efficiency is responsive, a valve member that might be 70 of Figure 1 or 68 of Figure 2.

With the furnace of Figure 1 the rate of fuel consumption has a constant value $r$ and the duration of the period L is given by the line $t$, the fuel economy being greatest when $t$ is maximum, as indicated at the adjustment D.

The figure of merit with respect to fuel economy may be taken as $t/r$, or when $r$ is constant by $t$.

The lines $r'$ and $r''$ are for fuel rates respectively increasing and decreasing twenty-five per cent in progressing from A to G, and the lines $t/r'$ and $t/r''$, being plots of figures of merit with respect to fuel economy assuming the fuel rates $r'$ and $r''$ respectively, indicate that any shifting of the fuel economy peak from the adjustment D is too small to show up.

The sense of the curves of Figures 7 and 8 is a clear indication that during the high settings H the best adjustment of the valve 70 of Figure 1 or of the valve 68 of Figure 2 is that which reduces the requisite period of high heating to a minimum, and that during the low setting periods L the best adjustment is that which increases the period of low heating to a maximum.

There is also a clear indication that when the adjustment member is in its best position, as at D, a small change of adjustment in either direction is substantially without effect upon the duration of the heating period whether high or low, and further that when the adjustment member is anywhere but very close to its best position, as at or very close to D, an even small change of adjustment position will produce a change in the durations of the heating periods.

Figure 9 gives hypothetical records A, B, C, D, E, F, and G that correspond to the correspondingly related adjustments of the graphs R and T of Figure 7.

Each line H' sloping in one direction cooperate with a reversely sloping line H'' to form an adjustment couple, the furnace operating under somewhat different air adjustments during the periods H' and H''.

The lengths of the reversely sloping lines H' and H'' thus represent the durations of two periods of high heating furnace operation with the same heat setting H of the fuel but with a different air adjustment.

By reason of the difference in the air adjustment the periods H' are shorter than the periods H'' and as a result the record A as a whole has a material slope, thereby indicating the need for a permanent adjustment, that may be affected by hand or automatically.

The periods of low setting show up on the A to G graphs as short vertical lines L' and L''.

Graph B taken under conditions of better air adjustment for the same number of high setting furnace operations illustrates a better condition with respect to combustion.

The periods of high setting have shortened and the difference between the reversely sloping records H′ and H″ which differ from one another by reason of a small difference in air adjustment has lessened, making the record as a whole more nearly vertical, indicating a better adjustment as compared to that resulting in curve A.

Curve C shows conditions still better and curve D shows conditions that correspond to best adjustment, the periods of high setting having shortened, the periods of low setting having lengthened and the difference in the adjustment when making the reversely sloping records H′ and H″ having made no perceptible difference of length between the lines H′ and H″, making the record as a whole substantially vertical.

The curves E, F and G show conditions again becoming progressively poorer as the adjustment is continued too far to the right (Figure 7), the general slope of the records reversing when the adjustment is shifted beyond D.

Figures 13 and 14 correspond to the curves A and D of Figure 9 with the difference that the vertical ordinants are more nearly in accord with what should be usual practice.

In operation after obtaining the record A of Figure 9 there may be a hand adjustment and if such adjustment results in record B of lesser slope in the same direction, and the lines H′ and H″ of reduced length, then further hand adjustment in the same direction should be made to ultimately secure record D which represents any adjustment as good as can be obtained, a change in adjustment in either direction effecting an increase in fuel consumption.

Figure 11 is intended to illustrate that the adjustments may be effected automatically by suitable mechanism.

Thus in Figure 11 the first pair of reversely sloping records 74 and 75 correspond to any pair of reversely sloping records H′ and H″ of Figure 9.

By means of suitable mechanism, preferably automatic, the difference of durations of the H′ and H″ periods is used to effect a permanent adjustment which results in the next pair of reversely sloping records 76 and 77 corresponding in the illustration to any of the pairs of reversely sloping records shown in curve B of Figure 9.

In the same way successive adjustments after succeeding adjustment pairs of reversely sloping lines bring about the condition D of Figure 9, after which, with proper mechanism there is an automatic maintenance of the best adjustment, and if through changing furnace conditions, for example, through gradual change in the depth of fuel or/and in the depth of ashes above the grate, a different adjustment is needed to give best fuel economy this better position will be automatically sought out and maintained.

Figure 10 is a view corresponding generally to Figure 9 except that the records A, B, C, D, E, F and G are for the low heating setting.

As conditions get better the durations of low heating increase and the durations of high heating decrease, so that the graph D of Figure 10 includes reversely sloping records that are much longer than in curve A where the adjustment is not nearly so good.

Figure 12 corresponds generally to Figure 11 except that the adjustment, preferably effected automatically, is with respect to the periods of low heating in Figure 12 and with respect to the periods of high heating in Figure 11.

Figures 16 to 20 illustrate a simple embodiment of one form of a portion of my invention.

A thermostat 50 is connected to energize a solenoid 66 each time the temperature rises to the predetermined upper limit and de-energizes each time it falls to the predetermined lower limit and mechanism is provided whereby the solenoid advances a cam wheel 81 one notch in the direction of the arrow each time the solenoid is energized and each time it is de-energized.

The cam wheel 81 and a ball ratchet rocker 82 pivot side by side on a suitable pin 83, the rocker presenting a suitable ball 84 to the side of the wheel, the ball 84 occupying a suitable taper recess in the side of the rocker so as to lock the rocker to the wheel when the rocker moves in the direction of the arrow and to freely slide or roll with respect to the wheel during the rocker retraction.

The ratchet rocker is operated by a link 85 which has a pivot connection 86 with the lower end of a link 87 from the solenoid armature 80 and with the outer end of a rocker 88 that has a stationary pivot support 89 and has a downwardly extending arm 90 controlling the speed of a motor 53 to determine the high and low heat settings of a furnace 51.

The arm 90 carries a contact 91 in position to complete the motor circuit through a contact 92 when the solenoid is energized and through a contact 93 when the solenoid is de-energized.

Each time the thermostat makes circuit at 63 the solenoid armature 80 moves up, swinging the rocker 88 upwardly about its pivot 89 with an angular reciprocation of the ratchet rocker 82 to effect a forward movement to the cam wheel 81, and each time the thermostat breaks circuit at 63 the armature falls swinging the rocker 88 downwardly and again effecting a forward feed to the cam wheel by angularly reciprocating the ratchet rocker 82.

Figure 16 shows the solenoid armature in mid stroke, a momentary position at which the speed control arm 90 is mid way between its contacts 92 and 93 and at which the ratchet rocker 82 is in its most advanced position, retracting as the armature moves either up or down from mid position, the forward feed of the cam wheel being effected exactly the same when the armature moves upward as when it moves downward.

The cam wheel 81 is notched at uniformly spaced intervals on its outer circumference, the angular spacing of the notches 94 corresponding to the angular advance of the wheel during each up or down stroke of the solenoid armature.

A lever 95 pivoted at 96 presents a toe 97 in continuous resilient contact with the wheel and in position to register with the successive notches 94 at the ends of the advance strokes of the wheel, thereby insuring definite registering of the wheel with predetermined uniformly spaced angular positions of rest.

The lever 95, spring pulled at 98 into the cam, has two functions, one to effect the swing adjustment of a valve 99 that affects the effectiveness of combustion and the other to effect exact registration of the cam wheel with its predetermined positions of rest.

The valve 99 has a flexible connection 100 with the lever 95 such that the angular position of the lever determines the adjustment of the valve, this adjustment being varied by appropriately varying the depths of the notches 94 which successively register with the toe 97 of the lever during the successive periods of furnace operation.

Figure 22 shows different relations with respect to the angular position of the cam wheel 81, measured from the toe 97 of the lever 95.

The solenoid armature 80 and the speed control rocker 88, 90 reciprocate between high and low positions according to the graph 102, each stroke effecting a one-notch 45 degree advance of the cam wheel 81 and a shifting of the furnace setting by changing the speed of the motor 53.

The graph 103 indicates the horizontal longitudinal movement of a link 104 or the angular movement of a rocker 105 which is positioned by the link to control the direction of rotation and the rotation or non-rotation of an adjustment wheel 106.

Mechanism is provided for making the adjustment wheel 106 turn slowly one way during one period of an adjustment couple, for keeping it stationary the intermediate period of low heating and for making it turn slowly the other way during the other period of the couple.

The graph 103 is intended to apply for the type of record shown in Figure 9 or to the more desirable type shown in Figure 15, the full line and dot-and-dash line portions applying for the type of records illustrated in Figure 9 and the full line and dotted line portions applying for the Figure 15 type of record.

The full line portion of the graph 103 is the same for both types of records.

The graphs 107 and 108 indicate alternative movements that may be provided for the toe 97 of the rocker 96 as determined by the depths of the successive notches 94, the movements being shown only at the beginning of the high setting periods.

The graph 107 illustrates movements of the toe 96 to obtain records similar to those of Figure 9 and the graph 108 for the type of records shown in Figure 15.

In both types of records the swing adjustment, determined by the depth of the notch 94, should have one value for the periods recorded to slope one way and another value for the periods recorded to slope the other way.

The graphs 109 and 110 illustrate the movements of the toe 96 for low setting periods corresponding to the graphs 107 and 108 respectively relating to high setting periods.

The graphs 111 and 112 respectively combine the graphs 107 and 109 and the graphs 108 and 110, the graph 111 illustrating the proper arrangement of notches 94 if the cam wheel is to be used to obtain two records of the type illustrated in Figures 9 and 10 respectively for high and low settings, while the graph 112 gives the arrangement of notches 94 for the two records of the general type illustrated in Figure 15.

Figure 23 is a diagrammatic plot corresponding generally to Figure 22 except that the positions of different operating members are shown plotted against the angular positions of the cam wheel 81.

Successive strokes of the solenoid armature take place at the successive vertical lines taking up periods of time that are very short as compared to the durations of the heat periods intermediate successive shift strokes of the armature, making the shifts substantially abrupt steps on the time diagram.

The graphs 102′, 103′, 107′, 108′, 111′ and 112′ correspond to the graphs 102, 103, 107, 108, 111 and 112 respectively of Figure 22.

The cam wheel 81 is provided with a succession of lateral pins 115 which are spaced around the wheel at the same distance from the wheel axis but at suitably variant angular spacing to effect longitudinal variation in the position of the link 104 in order to vary the angular position of the rocker 105.

The pins 115 successively engage the link 104 at a notch 116, the outer end of the link being spring pulled downwardly at 117. The other end of the link 104 has pin connection 118 with the rocker 105 which pivots upon a shaft 119 that also pivots the wheel 106 and the drum 120.

The rocker 105 carries gearing for slowly rotating the adjustment wheel 106 from a shaft or wheel 121 in opposite directions at different high setting periods, the member 121 being slowly rotated in any suitable way, for example by the hour hand shaft or minute hand shaft of a clock or other motor.

The wheels 122 and 123 pivoted on the rocker 105 at 124 and 125 have continuous driving connection with the wheel 106, and the link 104 places the rocker in three different angular positions,—an outer position to the right in which the wheel 122 engages the drive member 121, a mid position in which neither wheel engages the drive member, and an outer position to the left at which the drive member engages the wheel 123.

During a first high heat period of an adjustment couple the rocker may be positioned for example to place the wheel 122 against the drive wheel 121 resulting in a slow clockwise rotation of the adjustment wheel 106, assuming the drive to be clockwise.

During the succeeding low heating period the rocker is in an intermediate position and the adjustment wheel 106 is stationary, and during the succeeding high heating period the rocker places the wheel 123 against the drive wheel which thereby slowly turns the adjustment wheel 106 anti-clockwise through the engaging wheels 123 and 126.

During each adjustment couple one of the wheels 122 or 123 is in mesh with the time or drive wheel 121 during one period of the couple and the other during the other period of the couple and there is an intermediate low heat period during which neither of the wheels 122 or 123 engages the time wheel.

All of the records that slope one way are of individually different adjustment couples and represent different periods that have the same adjusting position of the rocker 95, that have the same wheel 122 or 123 meshing with the time wheel 121, and the same direction of turning of the wheel 106.

Conversely the other wheel meshes with the time wheel, the rocker 95 is positioned for the other adjustment and the adjustment wheel 106 turns the other way during all of the periods represented by records sloping the other way, whether the records are of the type illustrated in Figure 9 or of the type illustrated in Figure 15.

In Figure 16 I have provided an adjustment valve 127 in the fan inlet pipe 128 with flexible connection 129 to a differential pulley 130 carried by the wheel 106, formed as an axial extension on the outer end of the drum 120.

The dimensions of the pulley may be selected so that a considerable angular turning of the wheel 106 will be required to accomplish a small change in the adjustment of the valve 127.

In this event many adjustment couples may be required to effect any very material change in the position of the valve, each adjustment couple however having its weight toward securing or maintaining a best position for the valve.

The driving member 121 journals on a fixed pivot extension from a stationary post 131 which is carried by a plate 132 that forms also a common main support for the adjustment member 106, solenoid 66, cam wheel 81 and associated mechanism.

The drive wheel 121 has an externally threaded sleeve extension 133 which surrounds the extended pivot 134 of the drive wheel and supports pen mechanism.

The recording pen 136 is mounted upon a hook shaped carrier 137 which hooks over the rotating threaded sleeve 133, being threaded to fit the thread of the sleeve, so that the carrier travels along the sleeve moving the pen across the chart on the drum 120 (Figure 20) in a direction longitudinal of the drum.

The drum 120 turns in one direction during one period of each high heat adjustment couple, is stationary during the intermediate low heat setting period and turns in reverse direction during the other high setting period of the adjustment couple, the result being records in accord with those of Figure 9 or those of Figure 15 depending upon the sequence of the periods of rotation to the right and of rotation to the left as already explained.

As illustrated the thread does not extend the full length of the sleeve 133, the pen stopping in its progression along the sleeve when it has passed the threaded portion of the sleeve.

The pen may be used at perhaps infrequent intervals to check up on the operation of the furnace.

The differential pulley connection 130 and 138 between the adjustment wheel 106 and the adjustment valve 127 produces a continuous automatic seeking for best adjustment so that there may be little need for recording the furnace conditions with respect to fuel economy except at more or less infrequent intervals when it may be deemed desirable to study and check the correct operation of the mechanism.

In Figure 16 the furnace 51 under adjustment is illustrated as an oil or gas burning furnace, such as that of Figure 1.

The connections to a coal furnace may be as illustrated diagrammatically in Figure 17 where the secondary air, for delivery into the furnace above the fuel bed travels to the furnace through a pipe 140, past flap valves 127, 99 and 141, that are respectively operatively connected to the differential adjustment wheel 130, to the swing adjustment lever 96 and to the lever 88 for determining the high and low heat settings, the flexible connection 142 between the lever 88 and the valve 141 being also connected at 143 to change the position of a valve 69 in a waste flue 58'.

The operation is then substantially as with the type of furnace using oil or gas.

In many cases the low heat settings are so low as to correspond practically to a furnace shut down in which case there may be little or no need for operating my device on the low heat settings, operation upon the high heat settings however being very much worth while, suitable connections being as illustrated in Figure 16.

In many other cases however, the low heat settings may be only a little lower and the high heat settings only a little higher than that for a maintenance of the desired temperature constant, and in these cases it is quite important to operate the device on both the high and the low heat settings.

It will be understood that the adjustment swings for both the high and low heat settings may be made by the one rocker 95, but that a separate adjustment wheel 106 operated by a separate link 104 will be required for the high and low settings, and such mechanism is illustrated in the embodiment of Figures 24 to 34.

When operating my device at the same time on both high and low heat adjustment couples, where a high heat couple comprises spaced periods of high heat setting that have a different air adjustment and that alternate with corresponding periods of low heat setting, suitable provision should be made to make the adjustments of the high heat periods independent of the adjustments of the low setting periods.

I illustrate diagrammatically in Figures 18 and 19 two only of the many arrangements for maintaining mutual independence between the adjustments of the high and low heat periods.

In Figure 19 I supply the adjusted air for the high and low heat settings through different conduit portions 145 and 146 of a longitudinally divided pipe by a suitable flap valve 141' connected to the rocker 88 to close the conduits 145 and 146 when the solenoid armature is respectively in its upward and downward positions, each conduit being open when the other is closed, and each conduit carrying swing and permanent adjustment valves 99 and 127 operated as already described.

In Figure 18 the arrangement is nearly the same except that the swing adjustment valve 99 is placed after the conduits 145 and 146 come together, thereby permitting a single valve 99 to be used for both the high and low heat settings instead of the two in the arrangement of Figure 19.

Figure 24 and 34 inclusive illustrate a different form of my invention, including some of the features already described, and others varied to adapt the device to operate at the same time on both the high and the low heat settings, to automatically shift the charts for new records at the end of each day, and to adapt it to automatically avoid making adjustments during such abnormal external conditions as would overshadow the effect of the adjustment swing.

The stationary supporting structure includes main side plates 150 and 151, two pairs of intermediate vertical plates 152, 153 and 154, 155 respectively, and connecting posts 156, 157, 158, 159, 160 and 161.

The solenoid 66' is operated by the thermostatically controlled external connections already described, each up stroke and each down stroke of the solenoid armature 80' effecting a one notch advance of a cam rotor unit that includes a cam wheel 162, a shaft 163 and cam wheels 164 and 165, the cam wheels being rigidly fastened to the shaft 163 which journals in the side plates at 166.

The stationary plates 154 and 155 (Figures 26 and 27) are carried upon the shafts 157 and 163, being located on opposite sides of the cam wheel 162, to give housing support in arcuate slots 167 to ratchet balls 168 and 169, and housing support to links 170 and 171 that cooperate with the cam 162 to operate the rockers 172 and 173 for effecting the swing adjustments.

The armature 80' is provided with link connection 174 to the outer end of a two-plate rocker 175 which is pivoted on the shaft 157, is arcuately perforated at 176 to pass the shaft 163 and makes contact with the outside of the ratchet balls 168 and 169 on opposite sides of the cam wheel 162.

The cam wheel 162, rigidly fastened to the shaft 163, operates between the stationary plates 154 and 155, each up stroke and each down stroke of the rocker 175 advancing the wheel a distance equal to the angular spacing between perforations 177 through the cam wheel, the ratchet balls 168 serving to advance the wheel 162 during the upstrokes and the balls 169 to advance the wheel during the down strokes.

The perforations 177 are uniformly distant from the wheel axis and of uniform angular spacing and are used in registering the wheel at definite positions at the end of each up stroke and of each down stroke.

The perforations 177 successively register axially at the end of successive strokes with pointed latch members 178 which mounted on opposite sides of the cam wheel in a bore 179 of a bracket 180 from the plate 151 spring press their points against opposite sides of the cam wheel, latching into the perforations at the ends of the strokes.

Springs mounted in the bore 179 back of the pointed plungers or latches 178 are not shown.

The up stroke and down stroke of the rocker 175 is adjustably limited by rubber stops 181 and 182 inside a dashpot 183 that makes the strokes more quiet.

The adaptation of the stops 181 and 182 to yield a little in combination with the plunger latch members 178 permits exact one-notch progression of the cam wheel without need for the extreme accuracy in the adjustment of the upper and lower stop positions that would otherwise be necessary.

An outside upwardly directed cup member 184 of the dashpot is loosely threaded laterally at 185 on to a horizontal stud that projects from the plate 151.

An innner downwardly directed externally threaded cylinder or barrel 186 adjustably threads into the cup 184, a locknut 187 being shown for setting the members in any adjusted position.

A rod 188 pivoted at its upper end to the outer end of the rocker 175 and making a sliding fit through a central bore through the upturned bottom of the barrel carries a piston 189 inside the barrel, a rubber washer 181 surrounding the rod inside the barrel above the piston.

A lower piston 191 vertically adjustable at 192 presents the rubber stop pad 182 beneath the upper piston.

The upstrokes of the armature are stopped when the upper and movable piston brings the rubber washer 181 against the end of the barrel at points adjustable by changing the position of the barrel with respect to the lower cup.

The down strokes of the rocker and armature are stopped by the bottom of the piston coming against the top of the rubber pad 182 at points adjustable by changing the position of the lower piston.

The cam wheel 162 is provided with a cam surface for effecting angular movement to rocker members 172 and 173 for use in making the high and low swing adjustments, for example to the valve 99 of Figure 19.

The rockers 172 and 173 are pulled at 194 and 195 respectively by the weight of valve operating connections to press the arms 196 and 197 radially inward toward the axis of the cam wheel and respectively against the outer end of the link member 171 and against the end 199 of the link 170.

The links 171 and 170 engage the cam at their inner ends and are guided to movement radial of the cam wheel by slot and pin connections 200 with the stationary plates 154 and 155, the notch by notch advance of the cam wheel which takes place at the moment of shifting of the furnace setting giving the desired movement to the rocker members 172 and 173 to effect the requisite swing adjustments at the furnace.

The cam wheels 164 and 165 are rigidly connected to the cam wheel 162 and are substantially alike except for differences of angular setting, one operating mechanism for the high heat periods and the other similar mechanism for the low heat setting periods, one being upon one side of the stationary plates 152 and 153 and the other on the other side of these plates which serve to support and guide operating links that engage the cam at one end and the mechanism under control at the other.

The cam wheel 164 comprises three cams 201, 202 and 203 of successively increasing radius from the adjacent plate 152.

A rocker 105' which is in every way similar to the rocker 105 already described, gives journal support to wheels 122' and 123' that are in continuous driving connection with the wheel 106' coaxial with the rocker pivot upon the shaft 157.

The rocker 105' is angularly positioned by a link 104', the cam 201 and pin 204 in the side of the rocker selectively to three positions,—that to turn the wheel 106' in one direction by engagement between the wheels 122' and 121', in position to maintain the wheel 106' stationary in that the wheels 122' and 123' are both out of engagement with the wheel 121', and in position to turn the wheel 106' in a reverse direction by a driving connection between the wheels 121' and 123'.

The link 104' presents a lateral pin 205 at its inner end through a radial slot 206 to the outside surface of the cam 201.

At the other end the link presents a V surface 207 against the pin 204 carried by the rocker, a spring 208 mounted on the rocker pressing the outer end of the link, laterally into engagement with the pin 204.

The link is spring pressed toward the cam 201 by a spring 209 which is deflected forwardly at an intermediate point by a stationary pin 210 carried between the plates 152 and 153 and has its ends in notches 211 of the links 104' and 212, thereby pressing the links 104' and 212 into engagement at the pins 205 and 213 with the cams 201 and 202 respectively.

The link 212 positions a rocker 214 pivoted on the shaft 159 to present a wheel 215 against the wheel 106' throughout an adjustment couple comprising a period of high heat setting, having one adjustment period during which the wheel 106' is turning in one direction, a period of low heat setting during which the wheel 106' is stationary and a second period of high heat setting of different air adjustment from the first during which the wheel 106' turns in reverse direction.

As a result the wheels 215 and 216 of which one, 215, is pivotally carried at 217 by the rocker and the other is pivoted upon the rocker shaft 159, move first in one direction during the first high setting period, are stationary during the intermediate period of low heating and move in the other direction during the final high heating period of the adjustment couple, and at the end of each adjustment couple have a net change of position normally dependent merely upon the effect of the difference adjustment for the two periods of the couple.

At the end of the adjustment couple the cam 202 in co-operation with the link 212, pin 218 and spring 219 move the rocker 214 about the pivot 159 to make the wheel 215 engage an adjustment wheel 220 which is pivotally mounted on the shaft 158 and has an adjustment connection with one of the valves 127 or 127', Figure 19.

At the end of each adjustment couple after the shift to the other setting has taken place the cam 202 through the link 212 and rocker 214 bring the wheel 215 first out of engagement with the wheel 106' and then into engagement with the wheel 220 that is connected to make the permanent adjustments.

After this latter engagement the wheel 216 upon the shaft 159 is returned to its zero position, that is, to its angular position at the beginning of the adjustment couple, the return movement being transmitted through the wheel 215 to the wheel 220 to effect the adjustment of the valve 127.

I provide means whereby the shifting of the rocker 214 from the position shown in Figure 24 in which the wheel 215 is meshing with the wheel 106' to the adjustment wheel 220 on the shaft 158 can only take place if the preceding adjustment couple has effected an angular change in the position of the wheel 215 not greater than could be reasonably expected as due to the difference of adjustments between the two periods of the couple.

If the angular movement of the wheel 215 at the end of the adjustment couple is abnormally large I prevent engagement between the wheel 215 and the wheel 220 that effects the permanent adjustments by means of a light metal rod 221 which has a longitudinally adjustable support in an externally threaded sleeve 222 which is adjustably threaded through a lug 223 on the rocker 214, as best seen in Figures 24 and 25.

The rod 221 is bent inward at 224 to present the inner end of the bend normally against the face 226 of the wheel 215.

The lower portion of the rod is bent away from the wheel and then vertically downward to be in position for the end of the rod to engage a stationary step 227 presented by the plate 153.

As a result the wheel 215 is blocked at its mid position from further downward movement to engage the wheel 220 upon the pivot 158 except when the rod has been first deflected outwardly by a lateral projection 228 on the side of the wheel 215, and I dimension this projection so that it can only register with the bend 225 at the end of an adjustment couple if the range of wheel movement is not greater than could be reasonably expected from the difference of adjustment in the two periods of the couple.

When the wheel 215 at the end of an adjustment couple has an angular position reasonably near to its initial position, that is when it is not further from its initial position than could be expected to happen from the mere difference of adjustment in the two periods of an adjustment couple the rod 221 is deflected to miss the stop 227, thereby permitting engagement between the wheels 215 and 220.

I provide the lateral face 226 of the wheel 215 with a lateral projection 228 having an angular extension dependent upon the desired permissible angular range of movement of the wheel 215.

When the difference at the end of an adjustment couple is normal the projection 228 will be presented to the rod at the bend 225 pushing the rod outwardly so that the lower end of the rod cannot engage the stop 227.

As a result the change of angular position of the wheel 215 is transmitted to the wheel 220 whenever such change is within the normal range that might be expected from mere difference of adjustments in the two periods of the couple, but is never transmitted to the adjustment member 220 when the change of angular position is too great to be incident to mere difference of adjustment of the couple periods.

The return of the wheels 216 and 215 to their initial positions is effected whether or not the rocker 214 moves into the position to bring the wheel 215 into engagement with the adjustment wheel 220.

I preferably weigh one or both of the wheels 216 and 215 so that they tend to return automatically to their initial positions, as indicated at 229, Figure 24, and in addition provide a cam return to initial position. As illustrated the weight 229 comprises a suitable lateral lug from the wheel 216.

The cam 203 Figure 24 positions a link 230 which has outer pivot support at 231, presents a pin 232 against the circumferential surface of the cam and presents a V-notch surface 233 toward the axis 159 of the wheel 216.

The link is strongly spring pressed at 234 toward the shaft 159 thereby maintaining strong contact pressure between the link and the cam at the pin 232, and I provide the wheel 216 with a pin 235 adapted to register with the apex of the V-notch 233 when the cam 203 presents one of its recesses 236 to the pin 232 and with the wheel 216 in its initial position.

When the V surface 233 moves inward it engages the pin 235 on one or other of the sloping surfaces, turning the wheel one direction or the other to bring the pin to the apex of the notch.

The adjustment effected by the wheel 220 may be upon a differential pulley such as that indicated in Figure 16 or by a single flexible wire or chain connected to the valve 127 at its lower end and wound around the pulley and weighted at its other end.

The wheel 106' which turns on the shaft 157 in one direction throughout one period of an adjustment couple and in the other direction throughout the other period of the couple desirably turns a chart drum 120' that may be similar to the drum 120 shown in Figure 20.

The drum 120' is shown journaling at one end on the shaft 157 and at the other end makes connection with the face of the wheel 106'.

As illustrated there is a ratchet connection between the drum and the wheel, the two normally turning as a unit but the drum receiving a ratchet advance with respect to the wheel at the end of a day in order to advance the chart day by day.

As illustrated in Figures 27 and 30 the rim of the drum 120' is provided with a succession of ninety degree notches 240 and the wheel is perforated at 241 to carry a ratchet ball 242. The ball is spring pressed at 243 to the edge of the drum, the drum being adapted to turn by forcing the ball 242 and spring 243 back as indicated in Figure 31 to pass the outer points intermediate the notches, the ball springing inward and registering with successive notches as indicated in Figure 30.

While I have described one drum 120' and other mechanism for operating on adjustment couples of the same setting, for example of the high heat setting, the same description will apply to the mechanism for operating adjustment couples of the other setting.

This mechanism is illustrated and marked with corresponding reference characters using prime marks.

I mount the charts for recording the condition of air adjustment during the high and low settings upon the drums 120' and 120'', mounting the pens to record on these charts upon pen arms 136' and 136'' that are connected by a link 244, that hook over and slide along the post 156 and that are progressed from initial positions at the right ends of the respective drums across the charts longitudinally of the drums by a nut member 245 resting upon the rotating threaded shaft 246.

The shaft 246 is rotated in one direction continuously and slowly in any suitable way, as by means of the motor of an electric clock indicated diagrammatically in dot-and-dash lines at 247, Figure 24.

The shaft 246 carries and turns with the wheels 121' and 121'' that rotate the wheels 106' and 106'' first in one direction during one period of an adjustment couple and then in reverse direction during the other period of the couple.

The wheels 121' and 121'' operate on different settings, one on the high heat adjustment couples and the other on the low heat adjustment couples.

The continuously rotating shaft 246 is threaded at 248 for a considerable portion of its length and the two pens coupled together at 244 and hooking over the horizontal post 156 are moved along the charts by the nut member 245, slowly from right to left while making a record and quickly from left to right when returning to initial position for a new record.

The nut member 245 is open at the bottom and carries rigidly fastened to it transversely extending parallel rods 250 that are shown relatively integral, being connected together at the rear.

The rods thread through transverse horizontal perforations 251 of the body 245 and passing forwardly loosely engaging opposite sides of the pen arm 136' hook over and during progression of the nut slide along the rod 161.

The rod member 250 is adapted to both pivot and slide at its forward end on the rod 161, the nut 245 having an opening at the bottom to permit angular movement about the rod 161 and upward deflection of the inner end 252 of the rod 250 lifts the nut from meshing with the thread on the shaft 246.

I provide a spiral spring 253 compressed between the nut 245 and the wheel 121', using this spring to effect an automatic return of the nut at the end of a day in order to start a new record.

When the nut progresses from its initial position at the right to move the pens to the left the inner end of the rod 250 is over a flat spring 254 and lower than the bottom of a forwardly offset portion of a horizontal plate 255 fixed between the main side plates 150 and 151.

As the nut 245 and its rod 250 progress to the left the inner end of the rod passes under the forwardly offset portion 256 of the plate 255 and with continued movement must depress the spring 254 which slopes diagonally upward to the left in a vertical plane parallel to the line of movement of the nut 245, the spring being higher than the top of the plate at points beyond the left end of the offset portion of the plate.

The rod 250 is supported from upward movement at its inner end until it passes the left end of the offset 256 when it is lifted by the flat spring to clear the top of the offset plate 256 and to lift the nut 245 out of mesh with the thread on the shaft 246.

The spring 253 has been continuously compressed throughout the advance of the nut and as soon as the nut is lifted out of mesh with the thread on the rotating shaft 246 the spring returns the nut to the right, with the inner end of the rod 250 riding along the top of the offset plate 256 to hold the nut out of mesh throughout the return movement.

When the inner end of the rod 250 runs off the right end of the offset plate it falls, returning the nut to mesh with the thread on the shaft 246, the inner end of the rod being now again lower than the bottom of the offset plate and above a low portion of the flat spring 254.

The cycle repeats over and over once a day to shift the pens for new daily records, the forward progression taking substantially a whole day and the return but a few moments.

I may desirably shift the position of the charts at the time of returning the pens to their initial position for a new record.

This involves effecting a relative angular movement between the drums carrying the charts and the wheels 106' and 106'', coaxial with the drums and normally turning with the drums first in one direction and then in the other.

As best seen in Figures 24, 27 and 30 to 33, I provide a ratchet connection between the wheels and drums, and use the upward movement of the rod 250 after it has passed beyond the left end of the offset 256 to advance the ratchet.

The ratchet mechanism includes means for simultaneously locking advancement of the wheels 106' and 106'' and advancing the drums 120' and 120'' one or more notches of the ratchets.

The ball ratchet connection, Figures 27, 30 and 31, between the drums and the wheels has been already explained.

To operate this ratchet I pivotally mount a rocker 260, Figures 27 and 32, midway between the two stationary plates 152 and 153 upon the shaft 157.

At the outer end of this rocker at a distance from the rocker axis sufficient merely to clear the wheels 106' and 106'' I mount a transverse rod 261, fastening it rigidly to the rocker to overlap the drums and provide ball ratchet connections at 262 and 262' between the rod and the respective drums.

I provide a link 263 with pivot support at its lower end on the rod 261 and with its upper end in position to be lifted by the rod 250 when this rod runs beyond the offset 256.

The link 263 extends upwardly from the rod 261 in a generally diagonal direction being suitably offset at 264 in order to let it present a pin projection 265 in the path of the upwardly moving rod 250 when this rod springs upward at the beginning of the return movement of the pen mechanism.

The spring 254 lifts the inner end of the rod 250 which in turn lifts the link 263 to effect a ratchet advance of the two drums 120' and 120''.

In order to prevent either of the wheels 106' or 106'' from following the drum I provide brake members 266, one for each wheel 106' and 106'', pivoted at 267 on the plates 152 and 153, weighted to automatically lock the wheels unless held in position of release by engagement with the transverse rod 261 carried by the rocker 260 and carrying the operating link 263.

As soon as the link 263 lifts the rocker and transverse rod the brake locks both wheels 106' and 106'' while the upward movement of the rocker effects a ratchet advance of the two drums.

In view of my invention and disclosure variations and modifications will doubtless become evident to others skilled in the art and I claim all such in so far as they fall within the reasonable spirit and scope of the invention.

Having thus described my invention, what I claim and desire to secure by Letters Patent, is:

1. The method of operating a thermostatically controlled furnace of the character indicated which consists in arranging the high or/and low heat periods in adjustment couples, in providing the furnace with one air adjustment during one of the periods of an adjustment couple and with a different air adjustment during the other period of the couple, and in using the resultant difference between the durations of the two periods to effect a change of air adjustment.

2. The method of operating a thermostatically controlled furnace of the character indicated which consists in arranging the high or/and low heat periods in adjustment couples, in providing the furnace with one air adjustment during one of the periods of an adjustment couple and with a different air adjustment during the other period of the couple, and in setting the air for uniformity in the time durations of the coupled periods.

3. The method of operating a thermostatically controlled furnace of the character indicated which consists in arranging the high or/and low heat periods in adjustment couples, each couple comprising a period of higher and a period of lower furnace air supply, in reversing the sequences of the higher and lower air supply periods in alternate adjustment couples, and in using the duration differences of successive coupled periods to progressively indicate or/and to effect furnace air adjustment.

4. A thermostat, a heater furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one high setting period for example having one furnace air adjustment and the succeeding high setting period a somewhat different furnace air adjustment, a furnace air adjustment member and mechanism for progressing the member in one direction during the said one period and in a reverse direction during the said succeeding period of the same setting.

5. A thermostat, a furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one high setting period for example having one furnace air adjustment and the succeeding high setting period a somewhat different furnace air adjustment, a movable chart mount, mechanism for progressing the mount in one direction during the said one period and in a reverse direction during the said succeeding period of the same setting, and a pen or the like adapted to move and record on the chart in a direction across the line of travel of the chart.

6. A thermostat, a furnace having alternate high and low heat settings, connections adapting the thermostat to shift the settings from high to low when a controlling temperature reaches a predetermined upper limit and back from low to high when it reaches a predetermined lower limit, in combination with means for providing the furnace with somewhat different air adjustments during alternate periods of the same setting, one high setting period for example having one furnace air adjustment and the succeeding high setting period a somewhat different furnace air adjustment, a furnace air adjustment member, a chart mount connected thereto, mechanism for progressing the member and mount one way during the said one period and in a reverse way during the said succeeding period of the same setting, and a pen or the like adapted to move on the chart in a direction transverse to the line of movement of the chart.

7. A thermostat, a heater furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one high setting period for example having one furnace air adjustment and the succeeding high setting period a somewhat different furnace air adjustment, a movable member, mechanism for progressing the member in one direction during the said one period and in a reverse direction during the said succeeding period of the same setting, a movable furnace air adjustment member spaced from the said first movable member, a movable mount, a transmission member thereon having a normal position, means for placing the mount to present the transmission member in operative connection with the said first movable member throughout its periods of forward and reverse movements for thereafter moving the mount to carry the transmission member away from the said first member and into operative engagement with the said adjustment member, and while in engagement with the adjustment member with the mount substantially stationary for returning the transmission member to its normal position from which it had been deflected by the said first movable member.

8. A thermostat, a heater furnace having alternate high and low heat settings, connections adapting the thermostat to shift the settings from high to low when a controlling temperature reaches a predetermined upper limit and back from low to high when it reaches a predetermined lower limit, in combination with means for providing the furnace with somewhat different air adjustments during alternate periods of the same setting, one high setting period for example having one furnace air adjustment and the succeeding high setting period a somewhat different furnace air adjustment, a first movable member, a chart carrier connected thereto, mechanism for progressing the member and carrier in one direction during the said one period and in a reverse direction during the said succeeding period of the same setting, a pen or the like adapted to move on the chart in a direction transverse to the line of movement of the chart, a movable furnace air adjustment member spaced from the said first movable member, a movable mount, a transmission member thereon having a normal position, means for placing the mount to present the transmission member in operative connection with the said first movable member throughout its periods of forward and reverse movements, for thereafter moving the mount to carry the transmission member away from the said first member and into operative engagement with the said adjustment member, and while in engagement with the adjustment member with the mount substantially stationary for returning the transmission member to its normal position from which it had been deflected by the said first movable member.

9. A thermostat, a heater furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one setting period for example having one furnace air adjustment and the succeeding period of the same setting a somewhat different furnace air adjustment, a first movable member, mechanism for progressing the member in one direction during the said one period and in a reverse direction during the said succeeding period of the same setting, a movable furnace air adjustment member spaced from the said first movable member, a movable mount, a transmission member thereon having a normal position, means for placing the mount to present the transmission member in operative connection with the said first movable member throughout its periods of forward and reverse movements, for thereafter moving the mount to carry the transmission member away from the said first member and selectively into one or the other of two positions determined by the deflection of the transmission member at the end of the said reverse movement, to the first position in the event of a deflection not greater than could be reasonably expected from the difference in the air adjustments, said first position placing the member in engagement with the said adjustment member, and the second position placing the transmission member out of engagement with both the said first and adjustment members, and for thereafter returning the transmission member with the mount stationary to its normal position from which it had been deflected by the first movable member.

10. A thermostat, a furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one setting period for example having one furnace air adjustment and the next period of the same setting a somewhat different furnace air adjustment, a rotatable chart drum, mechanism for turning the drum in one direction during the said one period and in a reverse direction during the said succeeding period of the same setting, a pen or the like adapted to move and record on the chart in a direction longitudinal of the drum, and means for retracting the pen to one side of the drum after it has completed its range of movement along the drum.

11. A thermostat, a furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one setting period for example having one furnace air adjustment and the succeeding period of the same setting a somewhat different furnace air adjustment, a rotatable wheel, a chart drum, ratchet connection between the wheel and drum adapting the two to normally rotate as a unit, mechanism for turning the wheel slowly in one direction during the said one period and in a reverse direction during the said succeeding period of the same setting, a pen or the like adapted to move and record on the chart in a direction longitudinal of the drum and means for advancing the ratchet connection between the wheel and drum and retracting the pen to one side of the drum after it has completed its range of movement along the drum.

12. A thermostat, a furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one setting period having one furnace air adjustment and the succeeding period of the same setting a somewhat different furnace air adjustment, a rotatable wheel, a chart drum, ratchet connection between the wheel and drum adapting the two to rotate normally as a unit, a slowly turning driveshaft externally threaded for a portion of its length and substantially parallel to the drum axis, a carriage threaded on its under side and downwardly engaging the said threaded portion of the driveshaft, a pen member positioned longitudinally of the drum by the carriage and recording on the chart, a transverse rod fastened at an intermediate point to the carriage having a sliding pivot support at one end, an offset plate at the other end of the rod above the rod end during the advance of the carriage and holding the rod end from upward movement, resilient means engaging and upwardly pressing the rod end into the offset plate as the carriage progresses along the shaft and lifting the rod end higher than the offset plate when the rod progresses beyond the offset, means for resiliently retracting the carriage when the rod end is lifted, thereby lifting the carriage from threaded engagement with the driveshaft, an operating link of the ratchet engaged and lifted by the rod when it moves upwardly after passing beyond the offset for advancing the ratchet, and mechanism for turning the wheel slowly in one direction during the said one period and in a reverse direction during the said succeeding period of the same setting.

13. A thermostat, a solenoid controlled by the thermostat, a cam wheel progressed forwardly each time the solenoid is energized or de-energized, a time wheel continuously rotating at a uniform rate of speed, a rocker positioned by the cam wheel angularly about a shaft, an adjustment wheeel adapted to turn on the rocker shaft, gearing mounted on the rocker continuously meshing with the adjustment wheel and meshing with the time wheel when the rocker is at one side of its range of movement to drive the adjustment wheel from the time wheel in one direction, being out of mesh with the time wheel when in its intermediate position and meshing with the time wheel to drive the adjustment wheel in reverse direction when the rocker is at the other side of its range of movement, and means operated by the cam wheel for setting alternate periods during which the adjustment wheel is moving in the same direction with a somewhat different furnace air adjustment.

14. Mechanism in accord with claim 4 characterized by the means for providing alternate settings with different air adjustments and the shifting from high to low and low to high settings being effected by the operation of the thermostat and including a solenoid, a cam wheel, a ratchet for forwardly progressing the cam wheel and link connection between the solenoid armature and the ratchet rocker adapting each upstroke and each downstroke of the armature to forwardly progress the cam wheel.

15. A thermostat, a heater furnace having alternate high and low heat settings, connections adapting the thermostat to shift the setting from high to low when a controlling temperature reaches a predetermined upper limit and back from low to high when it reaches a predetermined lower limit, in combination with means for providing the furnace with somewhat different air adjustments during alternate periods of the same setting, one high setting period for example having one furnace air adjustment and the succeeding high period a somewhat different furnace air adjustment, a furnace air adjustment member and mechanism for progressing the member in one direction during the said one period and in a reverse direction during the said succeeding period of the same setting, the means for providing alternate settings with different air adjustments and the shifting from high to low and low to high setting being effected by the operation of the thermostat and including a solenoid, a cam wheel, a rocker having pivot support upon a shaft laterally spaced from the axis of the cam wheel on one side thereof, having ball ratchet connections with the cam wheel on opposite sides of the wheel axis, and link connection with the solenoid armature, the ball on one side locking the rocker to the wheel on the upstroke of the armature and the ball on the other side locking the rocker to the wheel on the downstroke.

16. Mechanism in accord with claim 9 characterized by the means for returning the transmission wheel to normal position including a weighting on one of the wheels of the transmission train.

17. Mechanism in accord with claim 9 characterized by the means for returning the transmisson wheel to normal position including a wheel journaling on the pivot of the mount, the transmission member including a wheel continuously meshing with the wheel journaling on the mount pivot, a pin on said journaling wheel, a rocker having a V notch presented toward said pin, a cam normally holding the rocker away from the pin, and a spring strongly pressing the rocker to the cam, the cam having a recess to permit inward movement of the rocker to effect the return of the transmission wheel to its normal position by registering the pin in the apex of the notch.

18. Mechanism in accord with claim 15 characterized by the cam wheel being provided with a registration latch, with a dashpot for securing more quiet movement and with vertically adjustable stops for respectively limiting the up and down strokes of the rocker.

19. Mechanism in accord with claim 15 in which the rocker for effecting ratchet progression of the cam wheel includes a plate and ratchet balls each side of the wheel, the balls engaged by one plate on one side of the wheel being supported from deflecting the wheel laterally by the corresponding balls on the other side of the plate.

20. Mechanism in accord with claim 15 characterized by the cam wheel being provided with a registration latch, with a dashpot for securing more quiet movement and with vertically adjustable stops for respectively limiting the up and down strokes of the rocker, in which the rocker for effecting ratchet progression of the cam wheel includes a plate and ratchet balls each side of the wheel, the balls engaged by one plate on one side of the wheel being supported from deflecting the wheel laterally by the corresponding balls on the other side of the plate.

WILLIAM J. CROWELL, Jr.